United States Patent Office 3,151,155
Patented Sept. 29, 1964

3,151,155
PREPARATION OF CARBOXYLIC ACIDS FROM OLEFINS, CARBON MONOXIDE AND WATER IN THE PRESENCE OF A NICKEL- OR COBALT-BORIC ACID CATALYST
James Wade H. McKoy, Lake Jackson, and Norman Swanson, Freeport, Tex., assignors to The Dow Chemical Company, Midland, Mich., a corporation of Delaware
No Drawing. Filed Feb. 15, 1961, Ser. No. 89,367
4 Claims. (Cl. 260—533)

This invention relates to a process for the production of organic carobxylic acids from an olefin, carbon monoxide and water in the presence of an improved catalyst.

It is well known that organic carboxylic acids can be obtained by the reaction of olefins, carbon monoxide and steam in the presence of certain acidic catalysts, such as hydrogen halides and boron trifluoride. It is likewise well known that the reaction of olefins, carbon monoxide and water is catalyzed by the presence of cobalt, nickel and salts of cobalt and nickel in the absence of inorganic acidic substances such as hydrogen halides, inorganic oxygen containing acids and boron trifluoride. These previously known processes for the preparation of organic carboxylic acids from olefins, carbon monoxide and water, with or without the various catalysts and activators are known to have certain disadvantages in that the reactants and products of many of them are corrosive to pumps and reaction vessels, and material is precipitated in the reactor and effluent lines which causes catalyst deactivation and reactor plugging.

It is therefore an object of this invention to provide an improved catalyst system for the production of an organic carboxylic acid from an olefin, carbon monoxide and water.

A further object of this invention is to provide a continuous process for the production of organic carboxylic acids from an olefin, carbon monoxide and water at elevated temperatures and pressures wherein substantially no insoluble precipitate is formed and catalyst losses are minimized.

Other objects and advantages of this process will become obvious from the following specification and claims.

It has now been discovered that in the preparation of an organic carboxylic acid from an olefin, carbon monoxide and water in the presence of a carbonylation catalyst, the addition of boric acid not only enhances the reaction, but increases the catalyst life and prevents the formation of insoluble residues which plug equipment. All previous processes employing carbonylation catalysts excluded all inorganic acids and considered them to be detrimental to the carbonylation catalyst. While it is true that a great majority of inorganic acidic substances are detrimental to the reaction, it has been found that an exception exists in boric acid. This unusual acid not only enhances the catalytic activity of the carbonylation catalyst but prevents precipitation of catalyst and its salts and complexes in the equipment during reaction and recovery of the product.

It is possible in the practice of this invention to employ the standard carbonyl forming catalysts commonly used in carbonylation reactions. Such substances include metallic nickel, metallic cobalt and salts, oxides, hydrides or alloys of nickel or cobalt. A quantity of nickel or cobalt catalyst of from 0.05 to 30% by weight of the total reaction mixture may be used with from 0.1 to 5% being preferred. The quantity of catalyst to be employed is determined based on weight of the nickel or cobalt and not upon the total weight of the salt thereof. Generally amounts less than 0.05% are not sufficiently active and amounts of greater than 30% increase separation problems without being additionally beneficial to the reaction.

In order to achieve commercially acceptable reaction rates, yields and conversions, it is necessary to employ temperatures of from 260° to 350° C. and pressures of from 2500 to 6000 p.s.i.g. It is preferred, however, to operate between 270° and 300° C. at pressures of from 4200 to 5000 p.s.i.g. In general the higher pressures are used with the more highly branched olefins.

The olefinic compounds which can be used in accordance with this invention are the lower hydrocarbons containing a single non-aromatic double bond between the carbon atoms, e.g., ethylene, propylene, butene-2, isobutylene, pentene-1, tetramethylethylene, diisobutylene etc.

As is common practice in the carbonylation art, it is desirable to employ the carbon monoxide in slight excess over the olefin, with ratios of 1.1 to 2.0 moles of carbon monoxide per mole of olefin being preferred.

In order to achieve the advantages of the boric acid addition to the reaction, it is necessary that the boric acid ions be in slight excess of the nickel or cobalt ions in the reaction mixture. An increase of boric acid concentration to 4 or 5 times the concentration of metal carbonylation catalyst is not detrimental, but in general a mole ratio of from about 1.1 to about 5.0 moles of acid per mole of catalyst is preferred.

Boric acid may be added to the reaction as a solid or a liquid and may be introduced with any one or a mixture of the reactants or in admixture with the carbonylation catalyst.

The reaction between the olefinic compound, carbon monoxide and water can be conducted either batchwise or continuously in the liquid phase. Residence time under the reaction conditions is a variable dependent on the particular olefin employed, the temperature and the pressure. In general, however, for the simple lower olefins, a residence time of from about 20 to about 120 minutes can be employed.

The invention is illustrated further by the following examples:

Example 1

Part 1. In order to demonstrate clearly the effect of boric acid on nickel stability under reaction conditions, an autoclave was charged with a catalyst solution of aqueous 18% propionic acid containing 0.47 wt. percent nickel as nickel propionate. The autoclave was pressured to 1500 p.s.i.g. with nitrogen and was heated under autogenous pressure to 280° C. The temperature was maintained between 280° and 293° C. for one hour, after which the autoclave was cooled, the pressure released and liquid was filtered. Analysis of the liquid showed it to contain only 0.07 wt. percent nickel demonstrating the high nickel fallout during heating when the standard nickel catalyst is used alone.

Part 2. Into a second autoclave was charged a catalyst solution of 18% propionic acid containing 0.47 wt. percent nickel as nickel propionate. To this was added sufficient boric acid to produce a 2/1 ratio of borate ions to nickel ions. The autoclave was pressured to 1500 p.s.i.g. with nitrogen and heated under autogenous pressure to 280° C. After one hour of heating at 280° to 293° C., the autoclave was cooled, the pressure was released and the liquid was filtered. Analysis of the liquid showed it to contain 0.44 wt. percent nickel, demonstrating the significant reduction in nickel fallout during heating in the presence of boric acid.

*Example 2*

Part 1. An autoclave was charged with 300 grams of an aqueous 17.2 wt. percent propionic acid containing 0.823 gm. of nickel as nickel carbonate. Then 100 gm. of ethylene and 50 gm. of carbon monoxide were passed into the autoclave and heating at autogenous pressure was commenced. At a temperature of 280° C. and a pressure of 2500 p.s.i.g. there was a sudden increase in temperature and pressure to a maximum of 303° C. and 2700 p.s.i.g. After 30 minutes reaction time, the autoclave was cooled and the pressure released. After filtration, the liquid product was found to contain 30.0% propionic acid and 0.38 gm. of nickel. The precipitated solids were found to contain 0.37 gm. of nickel with the remaining nickel being lost mechanically during handling and by adherence to the walls of the vessel.

Part 2. In the manner of Example 2, Part 1, in addition to 17.2 wt. percent propionic acid containing 0.823 gm. of nickel as nickel carbonate, 100 gm. of ethylene and 50 gm. of carbon monoxide, 3.15 gm. of boric acid was also charged to an autoclave. Heating under autogenous pressure, the reaction initiated at 153° C. and 2000 p.s.i.g. During 30 minutes reaction time, the maximum temperature and pressure were 283° C. and 3375 p.s.i.g. After filtration of the autoclave contents, the liquid product was found to contain 40.0 wt. percent propionic acid and 0.70 gm. of nickel. The precipitated solids were found to contain 0.0055 gm. of nickel with the remaining nickel being lost mechanically during handling and by adherence to the walls of the vessel.

*Example 3*

Part 1. Into a continuous reactor was fed a catalyst solution of aqueous 17.8 wt. percent propionic acid containing 0.5 wt. percent nickel as nickel propionate and a feed gas having the following average composition:

| | Percent |
|---|---|
| $C_2H_4$ | 43.7 |
| CO | 45.9 |
| $CO_2$ | 0.3 |
| Inerts | 10.1 |

The temperature was maintained between 286° and 294° C. and the pressure was maintained at 4500 p.s.i.g. During 4.5 hours of continuous operation, the average liquid effluent analyzed 68.6% propionic acid and the productivity was 21.05 lbs./hr. of propionic acid per ft.$^3$ of reactor volume.

Part 2. In a comparative experiment, a catalyst solution was prepared consisting of 0.5 wt. percent nickel as nickel propionate in an aqueous solution of 17.2 wt. percent propionic acid containing sufficient boric acid to maintain a borate ion concentration in excess of the nickel ion concentration. This solution was fed continuously to a reactor along with a feed gas having the following composition:

| | Percent |
|---|---|
| $C_2H_4$ | 42.6 |
| CO | 49.2 |
| $CO_2$ | 0.2 |
| Inerts | 8.0 |

The temperature was maintained at 287° to 289° C. and the pressure was maintained at 4500 p.s.i.g. During 4.5 hours of continuous operation the average liquid effluent analyzed 68% propionic acid, giving a productivity of 23.6 lbs./hr./ft.$^3$.

*Example 4*

Into a continuous reactor was fed a catalyst solution of 0.5% nickel as nickel propionate in water and a feed gas having approximately the following composition:

| | Percent |
|---|---|
| $C_2H_4$ | 44 |
| CO | 46 |
| Inerts | 10 |

The temperature was maintained between 287 and 289° C. and the pressure was maintained at about 4500 p.s.i.g.

The liquid effluent weighing 7020 gm. was analyzed showing a total production of 3780 gm. of propionic acid and containing 0.1% nickel. A balance for nickel therefore shows:

| | Gm. |
|---|---|
| Total Ni into reactor | 19.90 |
| Total Ni in product | 7.02 |
| Ni consumed or lost | 12.88 |

$$\frac{3{,}780 \text{ gm. propionic acid}}{12.88 \text{ gm. Ni}} = 292 \text{ gm. of propionic acid/gm. Ni}$$

*Example 5*

In order to demonstrate the effect of boric acid upon the productivity of the nickel catalyst, a run was made employing the same conditions of temperature, pressure and catalyst as employed in Example 4. The nickel concentration in the feed was 0.17% and sufficient boric acid was added to the feed to maintain borate ions in excess of the Ni ion concentration.

A total of 38,100 gm. of product was produced which contained 14,638 gm. of propionic acid and 0.09% Ni. A balance for Ni catalyst therefore shows:

| | Gm. |
|---|---|
| Total Ni into reactor | 45.4 |
| Total Ni in product | 34.3 |
| Ni consumed or lost due to fallout | 11.1 |

$$\frac{14{,}638 \text{ gm. propionic acid}}{11.1 \text{ gm. Ni}} = 1{,}320 \text{ gm. of propionic acid/gm. Ni}$$

We claim:

1. In a process for the production of an aliphatic carboxylic acid which comprises contacting in the liquid phase a lower olefin, carbon monoxide and water at a temperature of from 260° to 350° C. and a pressure of from 2500 to 6000 p.s.i.g. in the presence of at least 0.05 wt. percent based on the metal of a carbonyl-forming catalyst selected from the group consisting of metallic nickel, metallic cobalt, and salts, hyrides and oxides of cobalt and nickel and mixtures thereof, the improvement of conducting the reaction in the presence of an amount of boric acid sufficient to provide borate ions in excess of metal ions.

2. In a process for the production of an aliphatic carboxylic acid which comprises reacting in the liquid phase a lower olefin, carbon monoxide and water at a temperature of from 270° to 350° C. and a pressure of from 4200 to 5000 p.s.i.g. in the presence of from 0.05 to 30 wt. percent based on the nickel of a carbonyl-forming catalyst selected from the group consisting of metallic nickel, metallic cobalt, and salts, hydrides and oxides of cobalt and nickel and mixtures thereof, the improvement of conducting the reaction in the presence of boric acid wherein the borate ions are employed in an amount of from about 1.1 to about 5.0 times the nickel ions.

3. In a process for the production of propionic acid which comprises reacting ethylene with carbon monoxide and water in the liquid phase at a temperature of from 260 to 350° C. and a pressure of from 2500 to 6000 p.s.i.g. in the presence of from 0.1 to 5.0 wt. percent of nickel as nickel propionate, the improvement of conducting the reaction in the presence of boric acid wherein said boric acid is employed in an amount sufficient to maintain the borate ions in excess of the nickel ions.

4. In a process for the production of propionic acid which comprises reacting ethylene, carbon monoxide and water in the liquid phase at a temperature of from 270 to 300° C. and a pressure of from 4200 to 5000 p.s.i.g. in the presence of from 0.1 to 5.0 wt. percent of nickel as nickel propionate, the improvement of conducting the reaction in the presence of boric acid wherein the borate ions are employed in an amount of from about 1.1 to 5.0 times the nickel ions.

References Cited in the file of this patent

UNITED STATES PATENTS

| | | |
|---|---|---|
| 1,920,372 | Gosselin | Aug. 1, 1933 |
| 1,924,763 | Carpenter | Aug. 29, 1933 |
| 2,612,520 | Doumani et al. | Sept. 30, 1952 |